United States Patent
Kumar et al.

(10) Patent No.: US 9,262,244 B2
(45) Date of Patent: Feb. 16, 2016

(54) METHOD AND SYSTEM FOR EFFICIENT INTER-PROCESS COMMUNICATION IN A HIGH AVAILABILITY SYSTEM

(71) Applicant: Hughes Systique India Private Limited, New Delhi (IN)

(72) Inventors: Anil Kumar, New Delhi (IN); Shilpa Mahna Bhatnagar, New Delhi (IN)

(73) Assignee: Hughes Systique Private Limited, New Delhi (IN)

( * ) Notice: Subject to any disclaimer, the term of this patent is extended or adjusted under 35 U.S.C. 154(b) by 0 days.

(21) Appl. No.: 14/507,738

(22) Filed: Oct. 6, 2014

(65) Prior Publication Data

US 2015/0089513 A1 Mar. 26, 2015

Related U.S. Application Data

(63) Continuation of application No. 13/698,826, filed as application No. PCT/IN2011/000352 on May 19, 2011, now abandoned.

(30) Foreign Application Priority Data

May 19, 2010 (IN) .......................... 1166/DEL/2010

(51) Int. Cl.
*G06F 9/54* (2006.01)

(52) U.S. Cl.
CPC ..................................... *G06F 9/546* (2013.01)

(58) Field of Classification Search
None
See application file for complete search history.

(56) References Cited

U.S. PATENT DOCUMENTS

| | | | |
|---|---|---|---|
| 6,047,323 A | 4/2000 | Krause | |
| 2003/0091042 A1 | 5/2003 | Lor | |
| 2003/0188192 A1 | 10/2003 | Tang et al. | |
| 2004/0111519 A1* | 6/2004 | Fu et al. | 709/229 |
| 2006/0092940 A1* | 5/2006 | Ansari et al. | 370/392 |
| 2006/0242210 A1 | 10/2006 | Ring et al. | |
| 2007/0150614 A1 | 6/2007 | Ramachandran et al. | |
| 2007/0244908 A1* | 10/2007 | Rajan | G06F 3/0613 |
| 2009/0327241 A1* | 12/2009 | Douillet | G06F 17/30029 |
| 2010/0082737 A1 | 4/2010 | Dankle | |
| 2011/0211586 A1* | 9/2011 | Zhu | H04L 65/1043 370/401 |

FOREIGN PATENT DOCUMENTS

WO WO 95/31780 11/1995

OTHER PUBLICATIONS

International Search Report for International Application No. PCT/IN2011/000352 dated Oct. 7, 2011.

* cited by examiner

*Primary Examiner* — Tuan Dao

(74) *Attorney, Agent, or Firm* — Knobbe Martens Olson & Bear LLP

(57) ABSTRACT

A system, method and associated data structures for providing inter process communication where IPC endpoints may get relocated during the operation of the system. A device in accordance with the principles of the present invention comprises IPC filter rule management process, IPC filter rule lookup process, IPC filter rule table and plurality of IPC endpoints and a network interface for connectivity, wherein IPC filter rule management process creates, deletes and updates the entries in IPC filter rule table, and wherein IPC filter rule lookup process finds the matched rule and takes the forwarding actions. A system in accordance with the principles of present invention for providing inter process communication where IPC endpoints may get relocated during the operation of the system comprises a plurality of preferred devices which in an embodiment may be connected with plurality of functional peers through plurality of network interfaces.

4 Claims, 5 Drawing Sheets

METHOD AND SYSTEM FOR EFFICIENT INTER-PROCESS COMMUNICATION IN A HIGH AVAILABILITY SYSTEM

CROSS REFERENCE TO RELATED APPLICATIONS

This application claims the benefit and priority to and is a continuation of U.S. patent application Ser. No. 13/698,826, filed Nov. 19, 2012 which claims the benefit and priority to and is a U.S. National Phase Application of PCT International Application Number PCT/IN2011/000352, filed on May 19, 2011, designating the United States of America and published in the English language, which is an International Application of and claims the benefit of priority to Indian Patent Application No. 1166/DEL/2010, filed on May 19, 2010. The disclosures of the above-referenced applications are hereby expressly incorporated by reference is in their entireties. Furthermore, any and all priority claims identified in the Application Data Sheet, or any correction thereto, are hereby incorporated by reference under 37 C.F.R. §1.57.

FIELD OF THE DISCLOSURE

The present disclosure relates to inter process communication methods in software. More specifically, the present disclosure pertains to a method and associated system and data structure for efficient inter process communication in an environment where the IPC address associated with the destination entity may change at any time.

BACKGROUND OF THE DISCLOSURE

In conventional communication systems shown in FIG. 1, a node 10 is required to interface with many neighbors. These are collectively shown in FIG. 1 as "Functional Peer Left" and "Functional Peer Right". There are strict availability and scalability requirements for the said node on all interfaces. In order to meet availability requirements, the system is implemented using redundant software components, redundant hardware elements and one or more of several possible high availability schemes. Scalability requirements are met through modular design. Software components are mapped to hardware elements which provide an execution environment for these software components. High availability schemes are realized using appropriate check pointing, data replication and failure detection schemes. On failure of a working hardware element or software component, a standby (hot) software component starts functioning in place of the failed software component. It also includes switching of hardware elements.

FIG. 2 shows a communication system 10 comprising plurality of hardware elements 20 through 2x. Software functional components associated with the processing of the interworking with functional peer left comprising plurality of modules 20_500 through 20_5xx and with functional peer right comprising plurality of modules 21_600 through 21_6xx. Functionality of these components is defined by the relevant specification in terms of protocol data units (PDU) or messages received from the functional peer and actions to be taken by the node 10. Such an action is performed by the plurality of software functional components 20_500 through 20_5xx and 21_600 through 21_6xxx and may or may not produce PDU on the same interface or on other interface. To realize this processing, the software functional components 20_500 through 20_5xx and 21_600 through 21_6xx are required to communicate among each other. This type of communication is referred to as inter process communication (IPC). Software function components that communicate with each other using IPC are called IPC end points. This is realized using a network 50 internal to the node. Every hardware element is connected to network 50 through network interface 20_400 through 2x_400 and assigned layer 3 addresses 10.0.0.1 through 10.0.0.x+1. The IPC endpoints may be located on the same hardware element or on different hardware elements. IPC endpoints 20_300 through 2x_300 are responsible for delivering the IPC messages to the destination IPC endpoints. There are also several different timing or design specific considerations for inter process communication.

There are many standard platforms such as cPCI, ATCA, microTCA etc. available off the shelf which can be used to realize node 10. These standard platforms can accommodate one or more hardware elements (such as hardware boards) to realize plurality of hardware element 20 through 2x. These hardware elements have a CPU, memory, the required communication interface, other hardware accelerators and a host operating system such as Linux. A communication interface on the hardware element is assigned one or more IP addresses and used for local-to-remote communication. A loopback interface is also provided for local communication.

IPC routing module maps the destination IPC endpoint to IP address and IPC message is sent through TCP/IP and routed using a kernel IP routing table to the destination IPC endpoint. To communicate with a desired IPC endpoint, the source IPC endpoint is required to select the correct IP address associated with the hardware element where the desired destination IPC endpoint is located. In other words, an IP address is associated with an IPC endpoint. FIG. 3 shows IPC message exchange 1000 from 20_500 to 20_501 located on same hardware element 20. IPC endpoint 20_300 maps 20_501 to the IP address 20_400 and message is routed using IP routing table. IPC endpoint 20_300 receives the message and sends it to 20_501. FIG. 3 also show IPC message exchange 2000 from 20_500 to 21_600 located on hardware elements 20 and 21 respectively. IPC endpoint 20_300 maps 21_600 to the IP address 21_400 and message is routed using IP routing table. IPC endpoint 21_300 receives the message and sends it to 21_600. Hardware element 22 is hot standby to hardware element 21.

The association of an IP address with an IPC endpoint is not fixed and may change because of failure. FIG. 4 shows that on failure of hardware element 21, hardware element 22 becomes active and 21_600 is now associated with different IP address (22_400). This means IPC endpoint 20_300 should send messages for IPC exchange to IP address 22_400.

PDUs from left functional peer and right functional peer are processed in a user data context which may be established through control PDUs exchange or statically configured. There will be many user data contexts exist in the system, one each for every PDUs flow. A scalable system would implement plurality of software functional elements and plurality of hardware elements for handling many user data contexts. Due to this user data context associated with a flow will have many instances. Software functional components are required to communicate with each others to process PDUs associated with user data context. This means a software functional component together with user data context participates in inter process communication and are being referred to as IPC endpoints.

The IPC endpoints may get relocated because of exceeded capacity, failure or change in the Functional peer and will require change in the selected layer 3 address and destination IPC end point by source IPC endpoint for IPC messaging. IPC message exchange between two IPC endpoints is called as IPC message flow.

It can be seen that there is a need for a method and data structures for providing efficient inter process communication where IPC endpoints may be relocated during operation of the system.

SUMMARY OF THE INVENTION

To overcome the limitations described above, and to overcome other limitations that will become apparent upon reading the understanding of the state of art, the present invention discloses a system, method and associated data structures for providing inter process communication where IPC endpoints may get relocated during the operation of the system.

An embodiment of the present invention solves the above described problems by assigning a filter rule to IPC message flow, storing said rule in IPC filter rule table, identifying a match rule when an IPC message is send and forwarding IPC message according forwarding action of the matched rule. It further comprises updating the affected filter rules when IPC destination is relocated.

A device in accordance with the principles of the present invention includes IPC filter rule management process, IPC filter rule lookup process and IPC filter rule table, wherein IPC filter rule management process creates and updates the entries in IPC filter rule table, and wherein IPC filter rule lookup process finds the matched rule and takes the forwarding actions.

A system in accordance with the principles of present invention for providing inter process communication where IPC endpoints may get relocated during the operation of the system comprises a plurality of preferred devices which in an embodiment may be connected with plurality of functional peers through plurality of network interfaces.

An implementation according to a preferred embodiment of the present invention can use system events such as addition, deletion, failure and mobility of IPC endpoint; system scalability and/or combination thereof for IPC filter rule management process to update the IPC filter rule table.

The details of one or more implementations are set forth in the accompanying drawings and the description below. Other features will be apparent from the description and drawings, and from the claims.

DESCRIPTION OF THE DISCLOSURE

In the following description of the embodiments, reference is made to the accompanying drawings that form a part hereof, and which is shown by way of illustration of the specific embodiments in which the invention may be practiced. It is to be understood that other embodiments may be utilized without departing from the scope of the present invention.

The present invention provide method, system and associated data structures for providing inter process communication (IPC) where IPC endpoints may get relocated during the operation of the system.

As used herein, the term "filter rule" collectively refers to filter mask, filter value and forwarding action. As used herein, term "filter mask" collectively refers to fields of IPC message such as source and destination IPC endpoint identifiers, IPC message flow identifier and any other fields in IPC message. As used herein, the term "filter value" refers to the values of the fields selected by filter mask for the said rule. As used herein, filter mask and filter value of a filter rule uniquely associates a filter rule with an IPC message flow through and vice a versa. As used herein "forwarding action" refers to the address and outgoing interface to be used for forwarding IPC message. As used herein, the term "matched rule" or "selected rule" refers to a rule which is when a filter mask of the said rule is applied on an IPC message, resultant fields' values are equal or identical to the filter value of the said rule.

An embodiment of the present invention solves the above described problems by assigning a filter rule to IPC message flows, storing said rules in IPC filter rule table, identifying a match rule when an IPC message is send and forwarding IPC message according to forwarding action of the matched rule. It further comprises updating the affected filter rules when IPC endpoint is relocated.

Figure 1:
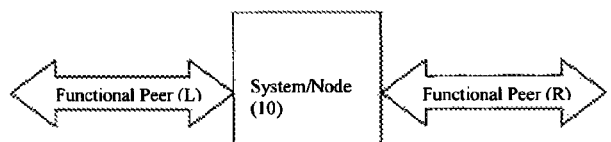
FIG. 1 shows a typical data communication system
Figure 2:
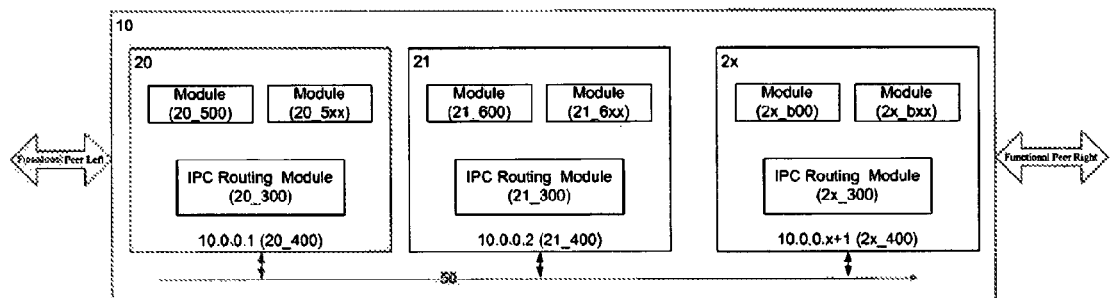
FIGS. 2 through 4 show the conventional method of IPC message forwarding
Figure 3:
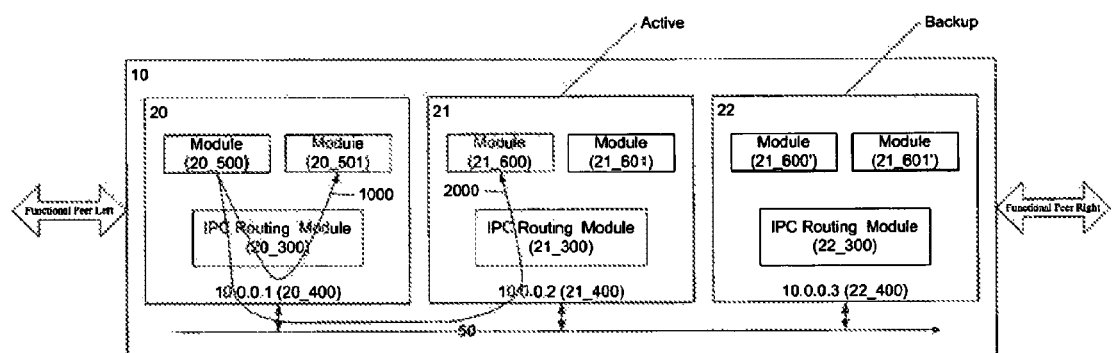
Figure 4:
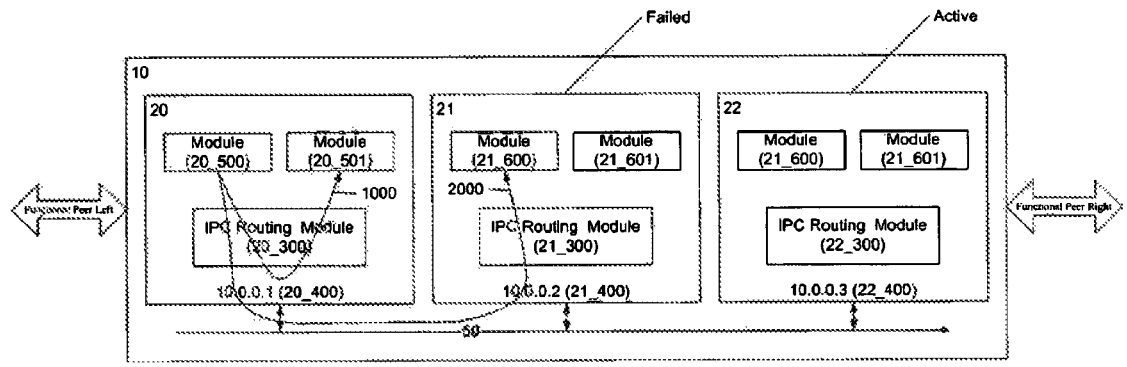
Figure 5:
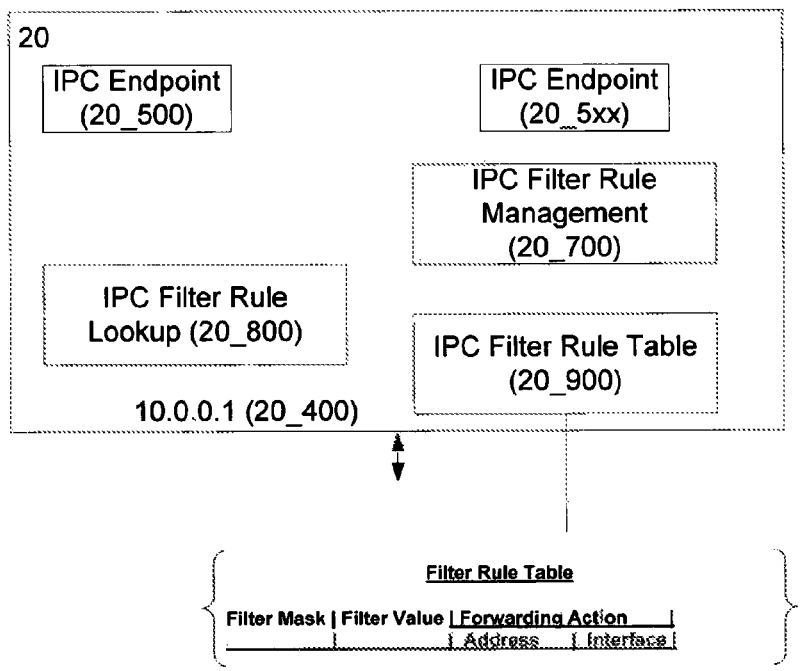
FIG. 5 shows a device and associated data structure according to a preferred embodiment

A device in accordance with the principles of the present invention as shown in FIG. 5 includes IPC filter rule management process (20_700), IPC filter rule lookup process (20_800), IPC filter rule table (20_900) and plurality of IPC endpoints 20_500 through 20_5xx and a network interface (20_400) for connectivity, wherein IPC filter rule management process creates, deletes and updates the entries in IPC filter rule table, and wherein IPC filter rule lookup process finds the matched rule and takes the forwarding actions.

We use an IPC Filter Rule Table 20_900 to store the Filter rules for efficient lookup. In the following discussion 'IPC Filter Rule Table' and 'Table' are used interchangeably. This table comprises:

1. Filter Mask: defines the fields of IPC message to be used from the IPC message for matching the entry in the table. An implementation according to a preferred embodiment may use source and destination IPC endpoint identifiers, IPC message flow identifier and any other fields in IPC message Source Identifier. Source and destination IPC endpoint identifiers may be mapped to the network address in the packet or any identifiers assigned to the IPC end points. IPC message flow identifier is an identifier assigned to uniquely identify an IPC message exchange between two IPC endpoints. IPC flow identifier may also be a protocol field defined by communication protocol.

2. Filter Value: defines the value(s) for the corresponding fields of an IPC message selected by Filter Mask. A value can be wild card, which is a match for all possible values of the corresponding field.

3. Forwarding Action—Address: provides the IP address or IPC endpoint identifier to be used for forwarding the IPC message.

4. Forwarding Action—Interface: Network interface to be used for forwarding the IPC message. "lo" is a special interface. If IPC message is forwarded through this interface then it is delivered to a IPC endpoint exists locally on the same hardware element. This forwarding mechanism is operating system dependent and can be for example, socket, POSIX queue, shared memory.

An implementation according to preferred embodiment of the present invention can use system events such as addition, deletion, failure and mobility of IPC endpoint; system scalability and/or combination thereof for IPC filter rule management process to update the IPC filter rule table. IPC filter rule management process may be required to split an existing filter rule into two or more filter rules or merge many existing filter rules into one filter rule at the time of adding, updating or deleting a filter rule. Existing filter rule in the table is required to be splitted when there would be two or more filter rules with identical filter mask and filter value but different forwarding actions. A filter rule is splitted into multiple filter rules by adding one more fields to the filter mask. Two or more existing filter rules in the table are required to be merged into one entry when their forwarding actions are identical. Filter rules are merged by removing the one or more fields from the filter masks for which filter values are not identical.

Figure 6:
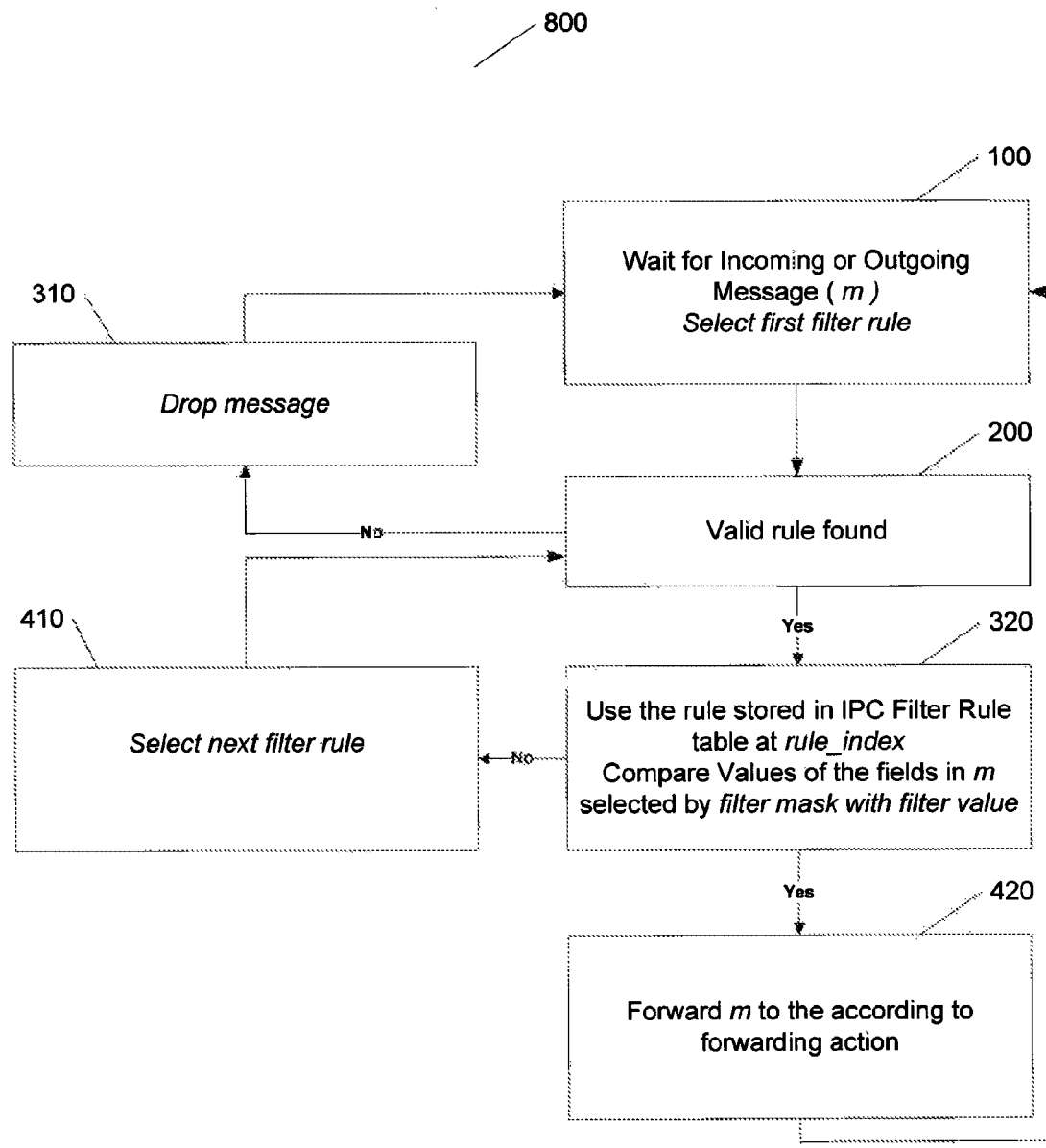
FIG. 6 is a flow chart describing an exemplary IPC filter lookup according to a preferred embodiment

FIG. 6 is a flow chart 800 of filter rules lookup performed by IPC Filter Rule Lookup process (20_800). Process begins by receiving an IPC message on either incoming or outgoing interface (100) on any of the interface of the system. All filter rules from beginning to end are checked (200, 410) if "values of the fields in the IPC message selected by filter rule's filter mask" are identical to "filter values" (320). If such a filter rule is found (420) then IPC message is forwarded to the filter rule's forwarding address (420). If end of the table is reached then message is dropped (310).

Figure 7:
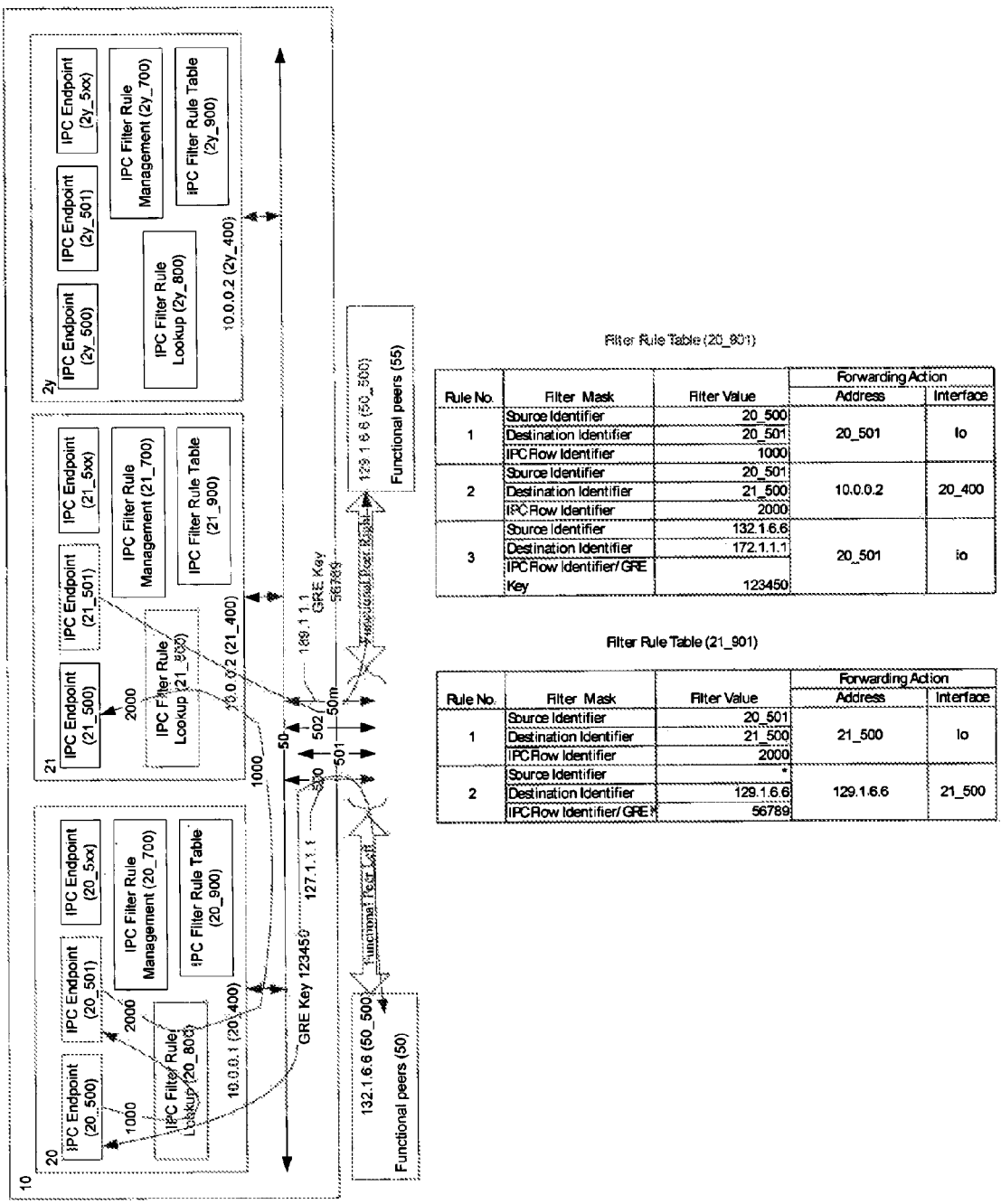
FIG. 7 is an exemplary system demonstrating IPC message flow forwarding according to a preferred embodiment

FIG. 7 shows an exemplary system 10 according to a preferred embodiment of the present invention comprising plurality of preferred devices 20 through 2y and which in an embodiment may be connected with plurality of external functional peers 50 and 55 through plurality of network interfaces 500 through 50m. IPC endpoints of IPC message flow 1000 are located on the same device 20. IPC endpoints of IPC message flow 2000 are located on different devices 20 and 21. A function peer 50 communicates with system 10, IPC endpoint 20_500. A protocol field (e.g. GRE Key 123450) in the message exchange is used as IPC message flow identifier. System 10 is connected with function peer 55 through network interface 500. IPC endpoint 21_501 of System 10 communicating with function peer 55 is also shown. A protocol field (e.g. GRE Key 56789) in the message exchange is used as IPC message flow identifier. System 10 is connected with function peer 55 through network interface 50m. Corresponding IPC Filter rule table is also shown in FIG. 7. IPC Filter rule table 20_901 is used by IPC Filter rule lookup process 20_800 and IPC Filter rule table 21_901 is used by IPC Filter rule lookup process 21_800.

Figure 8:
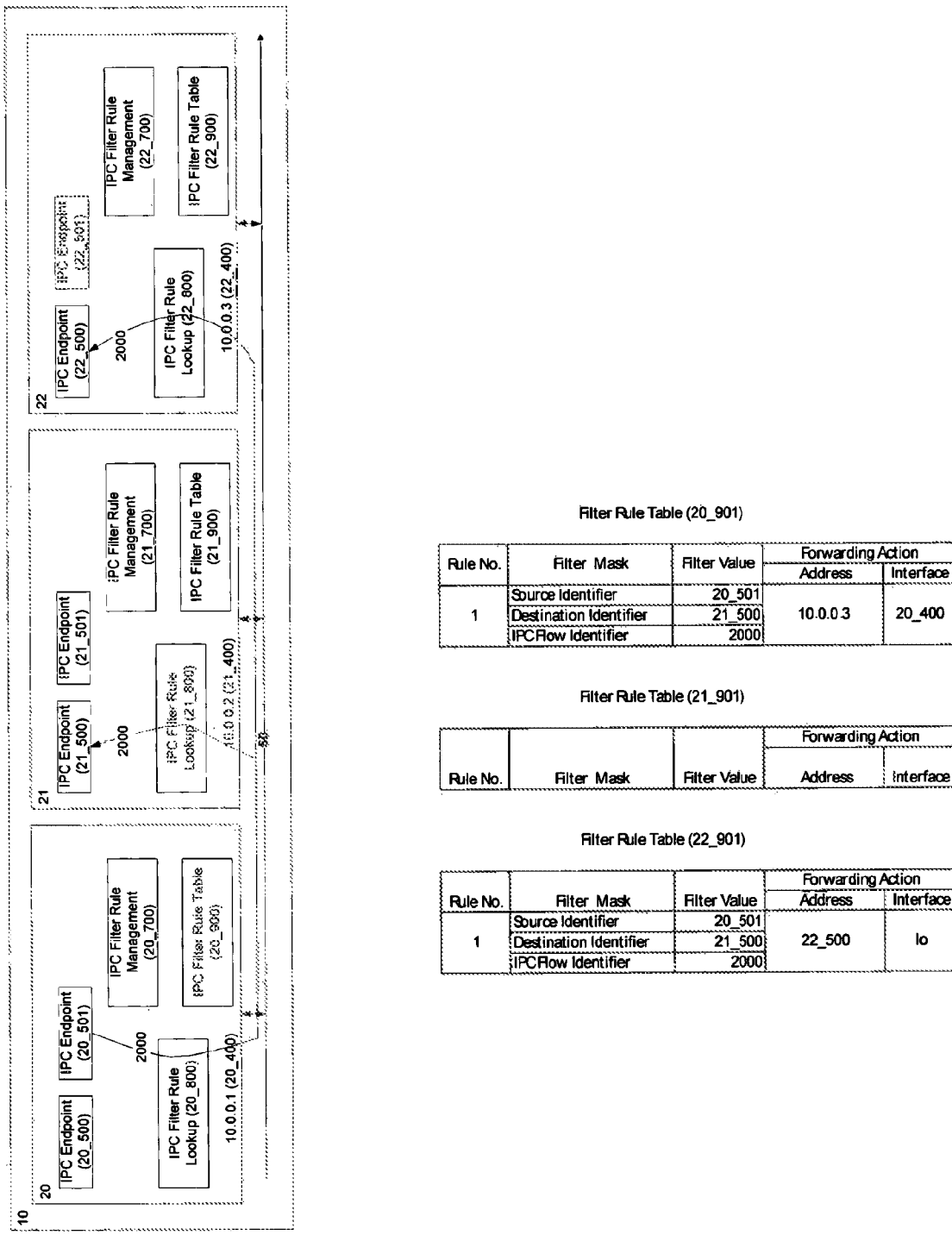
FIG. 8 is an exemplary system demonstrating relocation of IPC endpoints

FIG. 8 demonstrates the relocation of IPC end point according to the preferred embodiment of the present invention. IPC message flow 2000 is relocated from 21 to 22. IPC filter rule tables after the relocation are also show in the FIG. 8. Subsequent IPC messages of 2000 will be forwarded to 22 by IPC Filter Rule Lookup process 20_800. IPC Filter Rule Lookup process 22_800 will forward these IPC messages to 22_500.

The foregoing description of the exemplary embodiment of the invention has been presented for the purpose of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A device for providing inter process communication (IPC) where IPC endpoints may get relocated during the operation of the device, the device comprising:
   one or more network interfaces providing data communication with one or more remote IPC endpoints hosted by a remote device;
   at least one hardware element hosting one or more local IPC endpoints, at least partially implemented in hardware;
   an IPC filter rule management entity to:
      create IPC filter rules as IPC messages flows are created,
      update IPC filter rules as IPC message flows are relocated, and
      delete IPC filter rules as IPC message flows are deleted;
   an IPC filter rule table to store IPC filter rules; and
   an IPC filter rule lookup entity to:
      associate an IPC filter rule in the IPC filter rule table with an IPC message to be communicated between a local IPC endpoint and another IPC endpoint by comparing a field of the IPC message with a filter mask included in the IPC filter rule, the IPC filter rule further including a forwarding action indicating an forwarding address and a forwarding interface for communicating the IPC message to or from the local IPC endpoint and
      communicate the IPC message to the forwarding address via the forwarding interface specified by the IPC filter rule.

2. The device of claim 1, wherein the IPC filter rule management entity, upon detection of a failure of the another IPC endpoint, updates the IPC filter rule to include an updated forwarding address and an updated forwarding interface to a third IPC endpoint configured to provide similar functionality as the another IPC endpoint.

3. The device of claim 2, wherein the another IPC endpoint is included in the one or more local IPC endpoints and the third IPC endpoint is included in the one or more remote IPC endpoints, wherein the updated forwarding interface comprises one of the one or more network interfaces remote to the device.

4. The device of claim 2, wherein the another IPC endpoint is included in the one or more remote IPC endpoints and the third IPC endpoint is included in the one or more local IPC endpoints, wherein the updated forwarding interface comprises an operating system dependent interface local to the device.

* * * * *